United States Patent [19]

Perkins et al.

[11] Patent Number: 4,488,177
[45] Date of Patent: Dec. 11, 1984

[54] T.V. INTEGRATOR CIRCUIT AND HORIZONTAL OSCILLATOR

[75] Inventors: Geoffrey W. Perkins, Chandler; Gerald K. Lunn, Scottsdale, both of Ariz.

[73] Assignee: Motorola, Inc., Schaumburg, Ill.

[21] Appl. No.: 442,938

[22] Filed: Nov. 19, 1982

[51] Int. Cl.³ ............................................. H04N 5/04
[52] U.S. Cl. ................................... 358/158; 358/153; 358/154
[58] Field of Search ...................... 358/154, 158, 153; 307/246, 358, 362; 328/139

[56] References Cited

U.S. PATENT DOCUMENTS 3,639,780  2/1972  Lovelace ............................ 307/235

OTHER PUBLICATIONS

Current Mirrors Amplifiers Having Current Gains Less Influenced by the Base Currents of Component Transistors, by J. Radovsky, Technical Note, TN No. 949, Dec. 31, 1973, pp. 1-7.

Primary Examiner—Tommy P. Chin
Attorney, Agent, or Firm—Vincent B. Ingrassia

[57] ABSTRACT

In a T.V. integrator circuit which separates vertical and horizontal synchronization pulses, the time constants thereof are set by extracting from the integrator a current representative of a reference current which is used to trim an associated horizontal oscillator. Current mirror circuits are used to both generate the representative signal at the horizontal oscillator and to extract the representative signal at the integrator.

4 Claims, 3 Drawing Figures

*— PRIOR ART —*

— PRIOR ART —

T.V. INTEGRATOR CIRCUIT AND HORIZONTAL OSCILLATOR

BACKGROUND OF THE INVENTION

This invention relates generally to T.V. systems and more particularly, to a T.V. vertical integrator circuit having characteristics which are accurately defined by extracting therefrom a current or portion thereof, which current is used to trim an associated horizontal oscillator.

It is well known that the horizontal oscillator in a T.V. system must be accurately adjusted. In, for example, the horizontal oscillator described in U.S. Pat. No. 4,374,366 filed Dec. 29, 1980 entitled "HORIZONTAL OSCILLATOR" and assigned to the assignee of the present invention, the teachings of which are hereby incorporated by reference, capacitive spread is compensated for when the oscillator is trimmed by means of an external resistive network, which resistive network establishes an accurate reference current. It would be desirable if the characteristics of the associated vertical integrator could be accurately defined by the current, or portion thereof, established by the resistive network without further adjustment.

SUMMARY OF THE INVENTION

It is an object of the present invention to provide an improved horizontal oscillator and vertical integrator for use in a T.V. system.

It is a further object of the present invention to provide a method and apparatus for adjusting the time constants of a T.V. vertical integrator circuit by means of a reference current adjustment in an associated horizontal oscillator.

It is a still further object to the present invention to provide an apparatus and method of compensating for capacitive spreads in both a T.V. horizontal oscillator and its associated vertical integrator with a single adjustment.

According to a broad aspect of the invention there is provided an improved vertical integrator circuit of the type wherein a capacitive network is alternately charged and discharged and which is used in conjunction with an oscillator circuit which is trimmed by means of a reference current established at a node thereof, the improvement comprising current mirror means coupled between said oscillator and said integrator for extracting a current from said integrator which is representative of said reference current so as to set the time constants of said capacitive network.

According to a further aspect of the invention there is provided a method of setting the time constants of an integrator circuit of the type which is alternately charged and discharged and which is used in conjunction with an oscillator circuit which is trimmed by means of a reference current established at a node thereof, comprising generating a current signal representative of said reference current; and extracting said current signal from said integrator to set said time constants.

The above and other objects, features and advantages of the present invention will be more clearly understood from the following detailed description taken in conjunction with the accompanying drawings, in which:

DESCRIPTION OF THE PREFERRED EMBODIMENT

Figure 1:
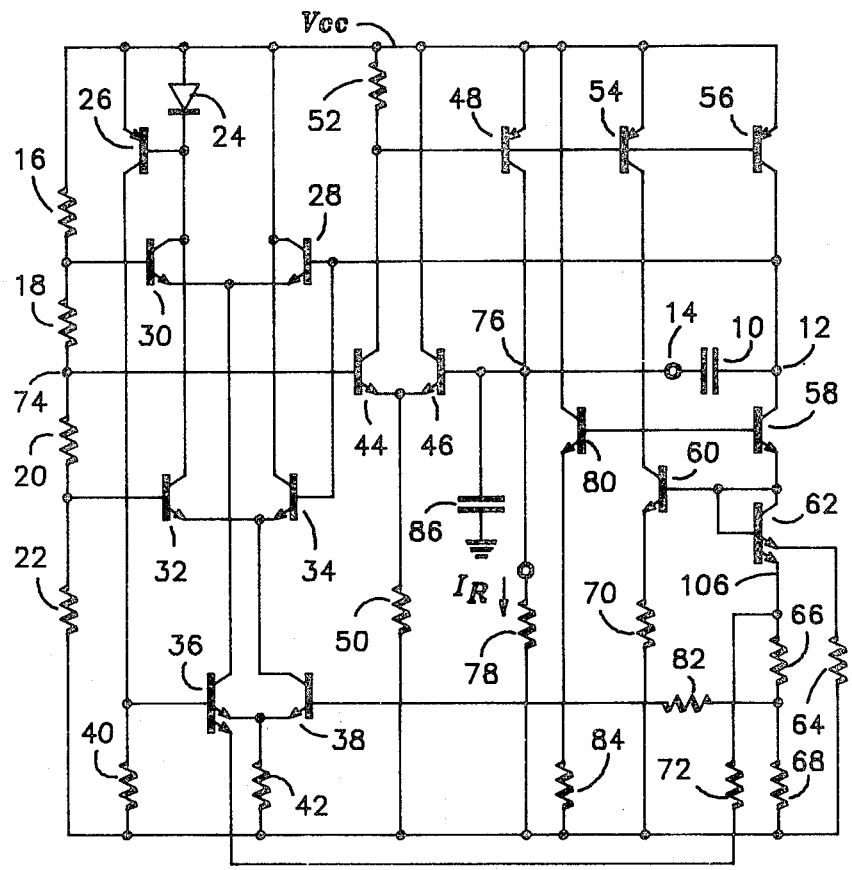
FIG. 1 is a schematic diagram of a known horizontal oscillator.

FIG. 1 is a schematic diagram of one example of a horizontal oscillator which may be used in connection with the present invention. It includes an on chip nitride capacitor 10 coupled between nodes 12 and 14. The circuit includes a bias chain comprised of resistors 16, 18, 20, and 22; a turn-around circuit comprised of diode 24 and transistor 26; a first comparator including transistors 28 and 30; a second comparator including transistors 32 and 34; a current source including transistors 36 and 38 and resistors 40 and 42; a reference amplifier including transistors 44, 46 and 48 and resistors 50 and 52; current mirror transistors 54 and 56; and a lower current mirror circuit including transistors 58, 60 and 62 and resistors 64, 66, 68, 70 and 72.

Reference amplifier transistor 44 has a base electrode coupled to a bias voltage at node. Thus, if transistors 44 and 46 are perfectly matched, an accurate reference voltage having a zero temperature coefficient will be produced at node 76. An accurate reference current ($I_R$) is then set up by means of an external resistive network (represented by resistor 78). Reference current $I_R$ is selected so as to compensate for capacitive spread in the oscillator.

The base of transistor 48 is coupled to the collector of transistor 44. Since transistors 48, 54 and 56 each have their base and emitter electrodes coupled together, the current produced at each of their collector electrodes will be substantially equal. Depending on the gain of the bottom current mirror circuit (transistors 58, 60 and 62), the current through transistor 58 will be either greater or less than a current through transistor 56. If greater, current will be pulled out of capacitor 10 to produce the down portion of an output signal ramp. This condition exists when the gain of the bottom mirror circuit is high. If the gain is reduced, the current flowing through transistor 58 will be less than the current flowing through transistor 56 and the difference will flow into capacitor 30 to produce an up portion of an output ramp. Finally, transistor 80 in connection with resistors 82 and 84 provides temperature compensation for nitride capacitor 10. Capacitor 86 represents a leakage capacitor coupled to the base of transistor 46.

For a complete discussion of the operation of the horizontal oscillator shown in FIG. 1 reference is made to the above cited copending patent application. Suffice it to say that this oscillator is trimmed by properly selecting reference current $I_R$.

Figure 2:
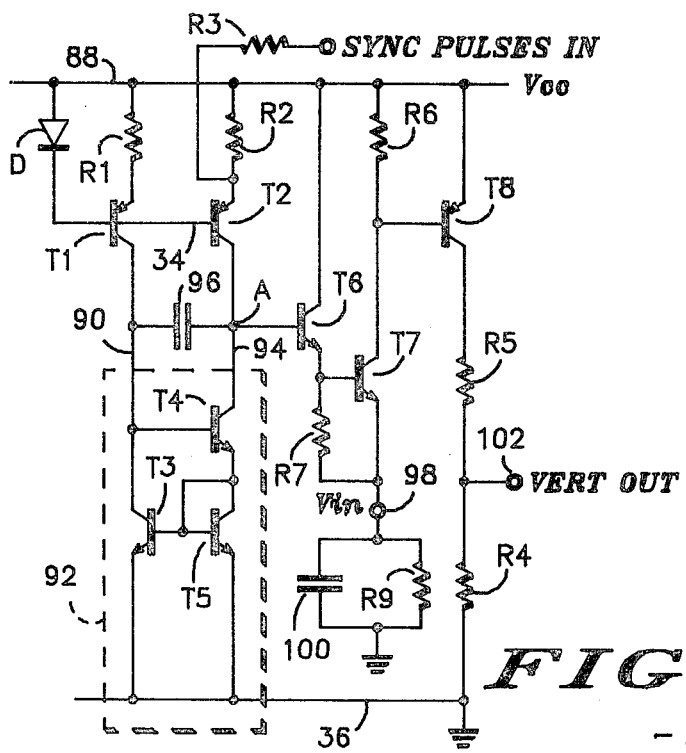
FIG. 2 is a schematic diagram of a known vertical integrator circuit.

An example of an integrated circuit for separating vertical synchronization pulses from a composite signal including horizontal and vertical synchronization pulses is shown in FIG. 2. A first current source, such as a normally conducting PNP transistor $T_1$ has its emitter coupled to a conductor 88 ($V_{CC}$) by way of resistor $R_1$.

The base of transistor $T_1$ is coupled to conductor 88 by way of a diode D. The collector of transistor $T_1$ is coupled to a lead 90 which forms a first current path to a current mirror circuit 92. A second current source, such as a normally conducting PNP transistor $T_2$, has its emitter coupled to conductor 88 by way of a resistor $R_2$ and has its base coupled to the base of transistor $T_1$. The collector of transistor $T_2$ is coupled to a lead 94 which forms a second current path to the current mirror circuit 92. The emitter of transistor $T_2$ is adapted to receive a signal to be integrated by way of a limiting resistor $R_3$. A capacitor 96 is coupled between leads 90 and 94 and therefore between the collectors of the first and second current sources $T_1$ and $T_2$. Current mirror circuit 92 includes an NPN transistor $T_3$ having its collector coupled to lead 90 and its emitter coupled to a reference potential such as ground. Also included in the current mirror circuit are series connected NPN transistors $T_4$ and $T_5$ with the collector of transistor $T_4$ coupled to lead 94 and its emitter coupled to the collector of transistor $T_5$ which has an emitter coupled to ground. The base of transistor $T_5$ is coupled to the emitter of transistor $T_5$ and also to the base of transistor $T_3$. The base of transistor $T_4$ is coupled to lead 90 and, therefore, to the collector of transistor $T_3$.

The potential at point A is applied to a variable bias slicer amplifier which includes transistors $T_6$ and $T_7$. Transistor $T_6$ has its collector coupled to collector 88; its base coupled to point A and its emitter coupled to a pin 98 by way of resistor $R_7$. Pin 98 may constitute a pad of the integrated circuit. Also coupled to pin 98 are a discrete capacitor 100 and a discrete resistor $R_9$ which may be external. Capacitor 100 and resistor $R_9$ are connected in parallel between ground and pin 98. Transistor $T_7$ has its collector coupled to conductor 88 by way of load resistor $R_6$, its base coupled to the emitter of transistor $T_6$, and its emitter coupled to pin 98. Transistors $T_6$ and $T_7$ constitute a Darlington type amplifier, and when transistor $T_6$ and $T_7$ conduct due to a positive voltage in the base of transistor $T_6$, capacitor 100 charges. The charge on capacitor 100 provides a slicing level $V_S$ that is determined by the magnitude of the voltage on the base of transistor $T_6$ and a time during which transistors $T_6$ and $T_7$ are nonconducting. The time constant of resistors $R_9$ and capacitor 100 should be adjusted to be long in comparison with the time between vertical pulses. Accordingly, the charge on capacitor 100 decreases very little between vertical synchronization pulses. The variable bias provided by the charge on capacitive 100 is determined by the magnitude of the voltage at point A which is in turn determined by the strength of the signal arriving at a T.V. receiver. Slicing level $V_S$ of the amplifier $T_6$ and $T_7$ is therefore determined by the strength of the received signal. Slicing level $V_S$ should occur about midway along the vertical pulse height for strong signals to provide good impulse noise performance and should increase up towards the vertical pulse tip as the incoming signal decreases.

The output of the slicing amplifier is applied to the base of inverting amplifier transistor $T_8$ which has its emitter coupled to conductor 88 and its collector coupled to ground by way of series connected resistors $R_4$ and $R_5$. The separated vertical synchronization pulses appear at the junction of resistors $R_4$ and $R_5$ at output terminal 102. For a complete description of operation of the integrator shown in FIG. 2, references made to copending U.S. patent application Ser. No. 220,614 filed Dec. 29, 1980 entitled "AN INTEGRATOR CIRCUIT FOR SEPARATING VERTICAL SINK PULSES" and assigned to the assignee of the present invention, the teachings of which are hereby incorporated by reference.

Figure 3:
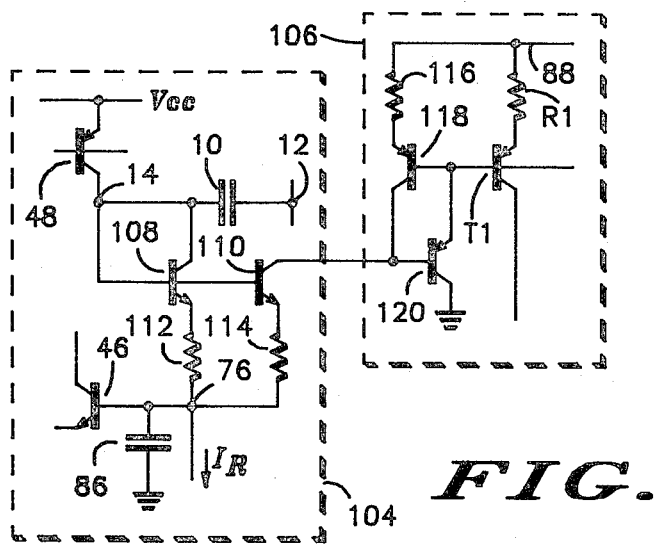
FIG. 3 is a schematic diagram illustrating circuitry for coupling the horizontal oscillator of FIG. 1 to the integrator of FIG. 2 such that when the oscillator is trimmed, the result in a reference current where a portion thereof is also extracted from the integrator so as to set its time constants without additional adjustment.

As stated previously, it would be desirable to use the same reference current $I_R$ or a portion thereof generated in the horizontal oscillator to set the time constants in the vertical integrator. This may be accomplished by breaking of the connection between nodes 14 and 76 in FIG. 1 and placing therebetween a current mirror circuit which extracts $I_R$ or a portion thereof from the integrator. This may be accomplished as is illustrated in FIG. 3 where dotted block 104 contains a portion of the oscillator including, in part, circuitry which has already been discussed, and where dotted block 106 contains a portion of the integrator, again including circuitry which has already been discussed. The reason for showing circuitry in blocks 104 and 106 which have already been discussed in connection with FIGS. 1 and 2 is to provide a proper structural relationship between the known circuits and the additional circuitry which permits the integrator time constants to be set by proper selection of $I_R$.

Referring to oscillator block 104 in FIG. 3, a current mirror circuit includes transistors 108 and 110. The emitters of both transistors 108 and 110 are coupled to node 76 via resistors 112 and 114 respectively. The collector of transistor 108 is coupled to node 14 as are the base terminals of transistors 108 and 110. As is well known, by properly scaling the emitters of transistors 108 and 110 or resistors 112 and 114 or some combination thereof, a predetermined portion of $I_R$ can be made to flow in the collector of transistor 110. Of course, consideration must not only be given to $I_R$ as a trimming current, but compensation must also be made for the additional current required by the mirror elements.

Referring now to block 106 which illustrates a portion of the vertical integrator circuit, diode D appearing in FIG. 2 has been deleted and replaced with a beta compensated current mirror circuit including resistor 116 and PNP transistors 118 and 120. The collector of transistor 120 is coupled to ground, and its emitter is coupled to the bases of transistors $T_1$ and 118. The emitter of transistor 118 is coupled to conductor 88 ($V_{cc}$) via resistor 116. To complete the circuit, the collector of transistor 110 in the oscillator is coupled to the collector of transistor 118 and to the base of transistor 120 in the integrator. In this manner, the currents flowing in the collectors of transistor $T_1$ and $T_2$ (see FIG. 2) can be controlled and the time constants can be set with only a single adjustment of $I_R$ in the oscillator. This technique is especially applicable to T.V. systems requiring high timing accuracy for the vertical pulse; e.g. Teletext and VIRS.

The above description is given by way of example only. Changes in form and details may be made by one skilled in the art without the parting from the scope of the invention.

We claim:

1. An improved vertical integrator circuit of the type which includes a first capacitor, first and second current sources for alternately charging and discharging said first capacitor, and a first current mirror circuit having at least first and second current paths coupled to said first and second current sources respectively, said improved vertical integrator for use in conjunction with an oscillator which is equipped with a second capacitor coupled between an output of said oscillator and a reference current node, the improvement comprising:
   current mirror means for extracting a current representative of said reference current, said current mirror means comprising:
      a second current mirror circuit coupled to said node and said second capacitor; and
      a third current mirror circuit coupled between said second current mirror circuit and said first and second current sources for receiving from said second current mirror circuit said current representative of said reference current.

2. A circuit according to claim 1 wherein said second current mirror circuit comprises:
   a first resistor;
   a second resistor;
   a first transistor having base and collector terminals coupled to said second capacitor and an emitter terminal coupled to said node via said first resistor; and
   a second transistor having a base coupled to said second capacitor, an emitter coupled to said node via said second resistor, and a collector to said third current mirror circuit.

3. A circuit according to claim 2 wherein said oscillator is a horizontal oscillator of a T.V. system.

4. A circuit according to claim 3 wherein said integrator separates horizontal and vertical synchronization pulses in a T.V. system.

* * * * *